Aug. 30, 1960 S. YANDO 2,951,168
ELECTROLUMINESCENT DEVICE
Filed Nov. 28, 1958
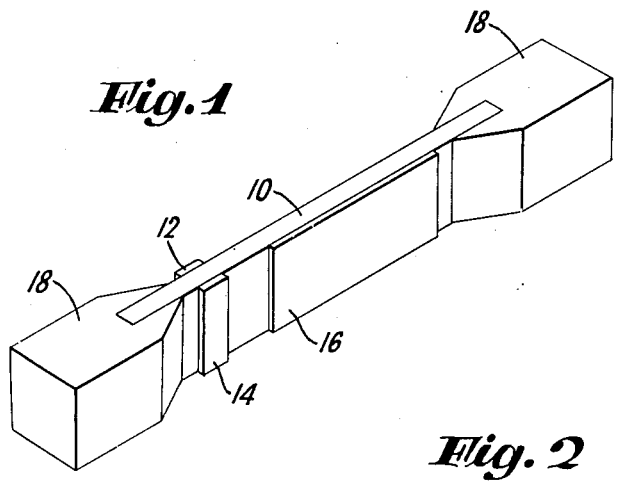
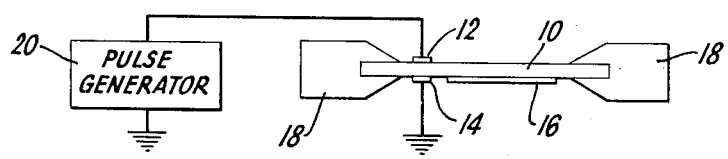
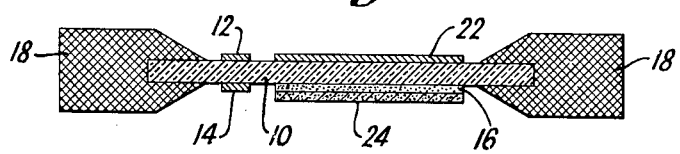
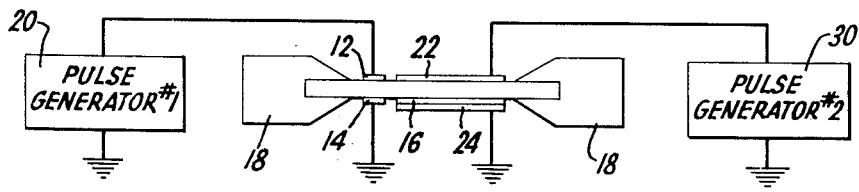
INVENTOR
*STEPHEN YANDO*
BY
ATTORNEY

__

2,951,168
ELECTROLUMINESCENT DEVICE

Stephen Yando, Huntington, N.Y., assignor, by mesne assignments, to Sylvania Electric Products Inc., Wilmington, Del., a corporation of Delaware Filed Nov. 28, 1958, Ser. No. 776,980

9 Claims. (Cl. 313—108)

My invention is directed toward electroluminescent devices.

Electroluminescent phosphors are phosphors which emit light in the presence of an electric field. Conventionally, such phosphors are formed into a solid layer as, for example, in the form of a single crystal or polycrystalline layer, or as a dispersion of phosphor particles in a plastic or ceramic dielectric media. The layer is then placed between two electrically conductive electrodes, at least one of which permits the passage of light therethrough. A voltage is applied between the two electrodes and light is emitted from the layer.

I have invented a new type of device employing an electroluminescent layer wherein an incoming electrical signal is transformed into a moving spot of light. More particularly, my device responds to an incoming voltage pulse in such manner as to produce an elastic wave propagating adjacent a surface of an electroluminescent layer. An electric field accompanies this wave and produces in the electroluminescent layer a light spot which travels across the layer in synchronism with the wave and field.

Accordingly, it is an object of the present invention to provide a new and improved electroluminescent device of the character indicated.

Another object is to provide a new electroluminescent device which derives a moving spot of light from an incoming voltage pulse.

Still another object is to provide a new electroluminescent device wherein a spot of light is caused to travel across an electroluminescent layer in synchronism with an electric field accompanying an elastic wave propagating adjacent the surface of the layer.

Yet another object is to provide a new electroluminescent device wherein a driving spot of light is derived from a first incoming electrical signal and the intensity of the emitted light is modulated in accordance with a second incoming electrical signal.

In accordance with the principles of my invention, first and second contacts are respectively secured to opposite front and rear surfaces of a strip of crystalline piezoelectric material adjacent one end thereof. The ends of the strip are terminated in such manner as to absorb, substantially without reflection, any incident elastic wave supplied thereto from said strip. An electroluminescent layer is placed in intimate engagement with the front surface of the strip in a position intermediate the appropriate contact and the other end of the strip.

A control voltage pulse is applied between these contacts and produces, in the region of the strip intermediate the contacts, a localized mechanical strain proportional to the amplitude of the pulse. As this strain changes, a disturbance, in the form of an elastic wave accompanied by an electric field, propagates along the strip from the contacts towards the other end of the strip, where it is absorbed without reflection. The intensity of the electric field is proportional to the time rate of change of strain and hence is proportional to the first time derivative of the voltage pulse.

As the elastic wave propagates along the strip, the accompanying electric field produces a spot of light in the electroluminescent layer which moves in synchronism with this wave, thus producing an effect similar to a line scanning operation in a cathode ray tube. The amount of light emitted from this spot is determined by the electric field intensity and increases monotonically therewith.

In another embodiment, I further apply a transparent electrode (the front electrode) over the exposed surface of the electroluminescent layer and, in addition, I apply an electrode (the rear electrode) to the rear surface of the strip (i.e. the surface of the strip remote from the electroluminescent layer).

When a modulating voltage, in the form of an amplitude modulated pulse, is applied between these two electrodes, the light intensity of the traveling spot will vary in accordance with this modulating voltage. This modulation action is produced because the intensities of the electric field established by the modulating voltage and the electric field accompanying the elastic wave are additive.

Illustrative embodiments of my invention will now be described with reference to the accompanying drawings wherein:

Fig. 1 is an isometric view of one embodiment of my invention;

Fig. 2 is a plan view of the embodiment of Fig. 1 together with an accompanying voltage generator;

Fig. 3 is a plan view of a modification of the embodiment of Fig. 1; and

Fig. 4 is a plan view of the modification of Fig. 3 together with accompanying voltage generators.

Referring now to Fig. 1, there is shown a thin strip of ribbon 10 of piezoelectric material; in this example the material is polarized lead zirconate-lead titanate. First and second contacts 12 and 14 which extend transversely to the long axis of the strip are secured to opposite surfaces of the strip adjacent the left end thereof, these electrodes being positioned opposite each other and subtending a region 13 of the strip. An electroluminescent layer 16 is placed in intimate contact with one surface of strip 10 intermediate the ends thereof and spaced apart from the contact 14. (This electroluminescent layer can be of any of the types previously described. Further, the layer can be permanently attached to the strip, for example, by means of a plastic dielectric or can be a separate layer mechanically and removably secured to the strip.)

Each end of the strip is terminated in such manner as to absorb substantially without reflection, any incident elastic wave propagating in said strip.

In order to provide such terminations, the ends of the strip surface must make contact with a suitable configuration of absorbing material as shown by terminations 18. More particularly, the piezoelectric material has a characteristic elastic impedance, and the terminations must be formed from another material having a similar characteristic impedance. If this other material had exactly the same characteristic impedance as the strip, the terminations would have the same cross sectional shape as the strip and would be attached to the ends of a strip essentially as a continuation of the strip. When the other material has a characteristic impedance which is not equal to that of the strip, a non-reflective termination can be made by coating the ends and immediately adjacent portions of the strip with this material, as is shown in Fig. 1. In this example, the material is lead, the characteristic elastic impedance of which differs from that of the lead zirconate-lead titanate.

As shown in Fig. 2, a control voltage pulse, for example, in the form of a sawtooth waveform supplied from pulse generator 20 is applied between the first and second contacts 12 and 14. This establishes an electric field within the strip region 13. The electric field vector points along a line perpendicular to both first and second contacts, the field direction being determined by the instantaneous polarity of the voltage pulse. The absolute value of the electric field vector, which is the field intensity, is proportional to the instantaneous value of the voltage pulse.

Due to the piezoelectric characteristics of strip 10, the electric field produces in the first region 13 a mechanical strain proportional to the instantaneous field intensity, and hence proportional to the instantaneous value of the cotrol pulse. This strain produces a disturbance proportional to the time rate of change of the strain, and hence proportional to the first time derivative of the control pulse. This disturbance propagates along the strip in the form of first and second oppositely directed elastic waves traveling toward the right hand and left hand ends respectively of strip 10. Each wave, due to the piezoelectric effect, is accompanied by an electric field, the intensity of which is proportional to the time rate of change of the strain and hence is proportional to the first time derivative of the contact pulse.

The electric field accompanying the first elastic wave produces a spot of light in the electroluminescent layer which moves in synchronism with the propagating first wave, thus producing the desired "scanning" effect. (The second wave and its accompanying field is almost immediately absorbed substantially without reflection in termination 18 and has no influence upon the operation of my device.)

The period of time (or scanning interval) required for the spot of light to traverse the strip 10 is determined both by the velocity of propagation of the elastic wave within the strip and the length of the section of the strip between the contacts and the right hand end of the strip. If, as is normally required, only one spot of light is to be displayed, the time interval between adjacent control pulses must be no less than the scanning interval.

For a given geometry and given amplitude of the control pulses, the light output from the moving spot produced in the device of Figs. 1 and 2 can be increased in the manner shown in Fig. 3. More particularly, Fig. 3 shows the device of Fig. 1 modified by the addition of a transparent or front electrode 24 covering the exposed surface of electroluminescent layer 16 and by the further addition of a second or back electrode 22 covering the same area as electrode 24 and applied to the surface of strip 10 remote from electroluminescent layer 16.

Electrodes 22 and 24 together with the electroluminescent layer and the subtended portion of strip 10 constitute a capacitor. The dielectric constant of the layer is low relative to the strip. Consequently, most of the energy carried by the electric field accompanying the elastic wave is concentrated in the electroluminescent layer; the light output is increased accordingly. The light output can be further increased by interconnecting electrodes 22 and 24.

In order to modulate the output of light from the moving spot of light, it is necessary to vary the intensity of the electric field acting upon the electroluminescent layer. This can be accomplished as shown in Fig. 4 wherein control pulses are applied between contact 12 and 14 as before and further wherein a modulating voltage, the magnitude of which varies with time, is applied between electrodes 22 and 24. This voltage as shown in Fig. 4 can be an amplitude modulated voltage pulse supplied from pulse generator 30. The modulating voltage establishes an electric field within the electroluminescent layer which changes with time.

Since at any time the modulating electric field and the electric field accompanying the elastic wave are additive, and since the modulating electric field changes in accordance with the modulating voltage, the light output or brightness of the spot of light is modulated accordingly. (Preferably, the amplitude of the modulating pulse should be approximately equal to that of the piezoelectrically induced voltage.)

In the absence of the traveling electric field, the modulating electric field will cause the electroluminescent layer to be uniformly illuminated. However, in general, the electroluminescent phosphors have a non-linear voltage brightness characteristic such that the background lighting effect is insignificant as compared to the brightness of the modulated spot of light.

As previously indicated, the length of the scanning interval is dependent upon the velocity of propagation of the elastic wave within the strip. This velocity, in turn, depends both upon the characteristics of the media and the type of acoustic wave employed. For example, the acoustic wave can be either longitudinal (i.e. a compression wave) or transverse (i.e. a shear wave). In general, the velocity of propagation for the same material varies with the type of wave.

In addition to polycrystalline lead zirconate-lead titanate which is rendered piezoelectric by electric field polarization, any other piezoelectric material either polycrystalline or single crystal can be used. Rochelle salt is an example of a single crystal material. Barium titanate is another example of a polycrystalline material.

What is claimed is:

1. An electroluminescent device comprising a strip of piezoelectric material; first and second contacts secured to opposite surfaces of said strip adjacent one end thereof, said first and second contacts being positioned opposite each other; an electroluminescent layer placed in intimate engagement with one surface of said strip intermediate the ends thereof and spaced apart from said contacts; and first and second terminations affixed to corresponding ends of said strip, said terminations absorbing substantially without reflection any incident elastic wave supplied thereto from said strip.

2. An electroluminescent device comprising a strip of piezoelectric material; first and second contacts secured to opposite surfaces of said strip adjacent one end thereof, said first and second contacts being positioned opposite each other; an electroluminescent layer placed in intimate engagement with one surface of said strip intermediate the ends thereof and spaced apart from said contacts, the exposed surface of said layer being coated with a transparent electrically conductive electrode; and first and second terminations affixed to corresponding ends of said strip, said terminations absorbing substantially without reflection any incident elastic wave supplied thereto from said strip.

3. An electroluminescent device comprising a strip of piezoelectric material; first and second contacts secured to opposite surfaces of said strip adjacent one end thereof, said first and second contacts being positioned opposite each other; an electroluminescent layer placed in intimate engagement with one surface of said strip intermediate the ends thereof and spaced apart from said contacts; the exposed surface of said layer being coated with a transparent electrically conductive electrode; first and second terminations affixed to corresponding ends of said strip, said terminations absorbing substantially without reflection any incident elastic wave supplied thereto from said strip, and another electrode covering the surface of said strip remote from said layer.

4. An electroluminescent device comprising a strip of piezoelectric material; first and second contacts secured to opposite surfaces of said strip adjacent one end thereof, said first and second contacts being positioned opposite each other; an electroluminescent layer placed in intimate engagement with one surface of said strip intermediate the ends thereof and spaced apart from said contacts; first and second terminations affixed to corresponding ends of said strip, said terminations absorbing substantially without reflection any incident elastic wave supplied thereto from said strip; and means to apply a voltage pulse between said first and second contacts whereby an elastic wave and an accompanying electric field propagate along the strip from said contacts toward the other end of said strip, said field producing a spot of light in said layer which moves in synchronism with said wave, the light output increasing monotonically with the intensity of said field, said intensity being proportional to the first time derivative of said pulse.

5. An electroluminescent device comprising a strip of piezoelectric material; first and second contacts secured to opposite surfaces of said strip adjacent one end thereof, said first and second contacts being positioned opposite each other; an electroluminescent layer placed in intimate engagement with one surface of said strip intermediate the ends thereof and spaced apart from said contacts, the exposed surface of said layer being coated with a transparent electrically conductive electrode; first and second terminations affixed to corresponding ends of said strip, said terminations absorbing substantially without reflection any incident elastic wave supplied thereto from said strip, and another electrode covering the surface of said strip remote from said layer, said electrodes being electrically interconnected.

6. An electroluminescent device comprising a strip of piezoelectric material; first and second contact secured to opposite surfaces of said strip adjacent one end thereof, said first and second contacts being positioned opposite each other; an electroluminescent layer placed in intimate contact with one surface of said strip intermediate the ends thereof and spaced apart from said contacts, the exposed surface of said layer being coated with a transparent electrically conductive electrode; first and second terminations affixed to corresponding ends of said strip, said terminations absorbing substantially without reflection any incident elastic wave supplied thereto from said strip, and another electrode covering the surface of said strip remote from said layer; means to apply a voltage pulse between said first and second contacts; and means to apply an amplitude modulated voltage pulse between said electrodes.

7. An electroluminescent device comprising a strip of piezoelectric material; first and second contacts secured to opposite surfaces of said strip adjacent one end thereof, said first and second contacts being positioned opposite each other; an electric field responsive layer placed in intimate engagement with one surface of said strip intermediate the ends thereof and spaced apart from said contacts, the exposed surface of said layer being coated with a transparent electrically conductive electrode; first and second terminations affixed to corresponding ends of said strip, said terminations absorbing substantially without reflection any incident elastic wave supplied thereto from said strip, and another electrode covering the surface of said strip remote from said layer; means to apply a voltage pulse between said first and second contacts; and means to apply an amplitude modulated voltage pulse between said electrodes.

8. An electroluminescent device comprising a strip of piezoelectric material; first and second contacts secured to opposite surfaces of said strip adjacent one end thereof, said first and second contacts being positioned opposite each other; an electroluminescent layer placed in intimate contact with one surface of said strip intermediate the ends thereof and spaced apart from said contacts, the exposed surface of said layer being coated with a transparent electrically conductive electrode; and another electrode covering the surface of said strip remote from said layer; first and second terminations affixed to corresponding ends of said strip, said terminations absorbing substantially without reflection any incident elastic wave supplied thereto from said strip; means to apply a voltage pulse between said first and second contacts; and means to apply an amplitude modulated voltage pulse between said electrodes.

9. An electroluminescent device comprising a strip of piezoelectric material; first and second contacts secured to opposite surfaces of said strip adjacent one end thereof, said first and second contacts being positioned opposite each other; an electric field responsive layer placed in intimate contact with one surface of said strip intermediate the ends thereof and spaced apart from said contacts; and first and second terminations affixed to corresponding ends of said strip, said terminations absorbing substantially without reflection any incident elastic wave supplied thereto from said strip.

References Cited in the file of this patent
UNITED STATES PATENTS
2,816,236    Rosen _____ Dec. 10, 1957